United States Patent [19]

Cheong et al.

[11] Patent Number: 6,061,777

[45] Date of Patent: May 9, 2000

[54] APPARATUS AND METHOD FOR REDUCING THE NUMBER OF RENAME REGISTERS REQUIRED IN THE OPERATION OF A PROCESSOR

[75] Inventors: Hoichi Cheong; Paul Joseph Jordan; Hung Qui Le; Soummya Mallick, all of Austin, Tex.

[73] Assignee: International Business Machines Corporation, Armonk, N.Y.

[21] Appl. No.: 08/959,646

[22] Filed: Oct. 28, 1997

[51] Int. Cl.[7] .................................................. G06F 9/46
[52] U.S. Cl. .................................. 712/23; 712/7; 712/8; 712/9; 712/26; 712/205; 712/206; 712/214; 712/215; 712/238; 712/240
[58] Field of Search .................................. 712/7, 10, 11, 712/23, 24, 26, 200, 205, 214, 222, 238, 240, 206, 8, 9, 215

[56] References Cited

U.S. PATENT DOCUMENTS

| | | | |
|---|---|---|---|
| 5,659,721 | 8/1997 | Shen et al. ........................... | 395/569 |
| 5,802,340 | 9/1998 | Mallick et al. ...................... | 712/218 |
| 5,809,450 | 9/1998 | Chrysos et al. ..................... | 702/186 |
| 5,826,070 | 10/1998 | Olson et al. ....................... | 712/222 |
| 5,872,949 | 2/1999 | Kikuta et al. ...................... | 712/216 |
| 5,881,263 | 3/1999 | York et al. ........................ | 395/393 |
| 5,884,061 | 3/1999 | Hesson et al. ..................... | 712/217 |
| 5,887,161 | 3/1999 | Cheong et al. ..................... | 395/591 |

*Primary Examiner*—Meng-Ai T. An
*Assistant Examiner*—Dzung Nguyen
*Attorney, Agent, or Firm*—Anthony V.S. England

[57] ABSTRACT

One aspect of the invention relates to a method for operating a processor. In one version of the invention, the method includes the steps of dispatching an instruction; determining a presently architected RMAP entry for the architectural register targeted by the dispatched instruction; selecting the RMAP entries which are associated with physical registers that contain operands for the dispatched instruction; updating a use indicator in the selected RMAP entries; determining whether the dispatched instruction is interruptible; and updating an architectural indicator and a historical indicator in the presently architected RMAP entry if the dispatched instruction is uninterruptible.

28 Claims, 11 Drawing Sheets

| ENTRY | STATUS | A-VECTOR FIELD | L-VECTOR FIELD | RH-VECTOR FIELD |
|---|---|---|---|---|
| 0 | | | | |
| 1 | | | | |
| | | | | |
| ⋮ | | | | |
| | | | | |
| n | | | | |
FIG. 4
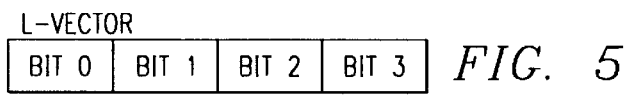
FIG. 5
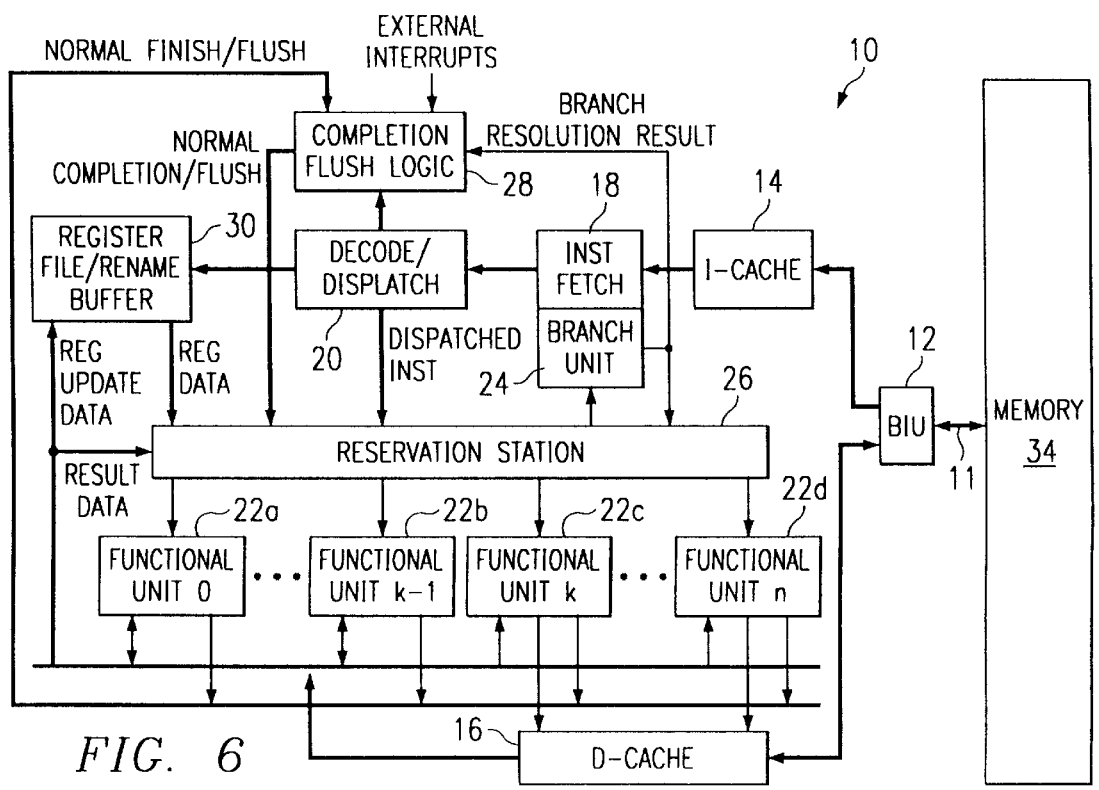
FIG. 6

| PHY REG | GPR | A | H | U | RH | L |
|---|---|---|---|---|---|---|
| 0 | 0 | 1 | 0 | 0 | 0 | 0 |
| 1 | 1 | 1 | 0 | 0 | 0 | 0 |
| 2 | 2 | 1 | 0 | 0 | 0 | 0 |
| 3 | 3 | 1 | 0 | 0 | 0 | 0 |
| 4 | 4 | 1 | 0 | 0 | 0 | 0 |
| 5 | 5 | 1 | 0 | 0 | 0 | 0 |
| 6 | 6 | 1 | 0 | 0 | 0 | 0 |
| 7 | 7 | 1 | 0 | 0 | 0 | 0 |
| 8 | | | | | | |
| 9 | | | | | | |
| 10 | | | | | | |
| 11 | | | | | | |

CYCLE 0

CYCLE 1

| PHY REG | GPR | A | H | U | RH | L |
|---|---|---|---|---|---|---|
| 0 | 0 | 0 | 1 | 0 | 1 | 1 |
| 1 | 1 | 0 | 1 | 1 | 1 | 1 |
| 2 | 2 | 1 | 0 | 1 | 0 | 0 |
| 3 | 3 | 1 | 0 | 0 | 0 | 0 |
| 4 | 4 | 1 | 0 | 0 | 0 | 0 |
| 5 | 5 | 1 | 0 | 0 | 0 | 0 |
| 6 | 6 | 1 | 0 | 0 | 0 | 0 |
| 7 | 7 | 1 | 0 | 0 | 0 | 0 |
| 8 | 0 | 1 | 0 | 0 | 0 | |
| 9 | 1 | 1 | 0 | 0 | 0 | |
| 10 | | | | | | |
| 11 | | | | | | |

*FIG. 8B*

CYCLE 2

| PHY REG | GPR | A | H | U | RH | L |
|---|---|---|---|---|---|---|
| 0 | 0 | 0 | 1 | 0 | 1 | 1 |
| 1 | 1 | 0 | 1 | 0 | 1 | 1 |
| 2 | 2 | 1 | 0 | 0 | 0 | 0 |
| 3 | 3 | 1 | 0 | 1 | 0 | 0 |
| 4 | 4 | 1 | 0 | 1 | 0 | 0 |
| 5 | 5 | 1 | 0 | 0 | 0 | 0 |
| 6 | 6 | 1 | 0 | 0 | 0 | 0 |
| 7 | 7 | 1 | 0 | 0 | 0 | 0 |
| 8 | 0 | 1 | 0 | 0 | 0 | |
| 9 | 1 | 0 | 0 | 1 | 0 | |
| 10 | 1 | 0 | 0 | 1 | 0 | |
| 11 | 1 | 1 | 0 | 0 | 0 | |

*FIG. 8C*

CYCLE 3

| PHY REG | GPR | A | H | U | RH | L |
|---|---|---|---|---|---|---|
| 0 | 0 | 0 | 1 | 0 | 1 | 1 |
| 1 | 1 | 0 | 1 | 0 | 1 | 1 |
| 2 | 2 | 1 | 0 | 0 | 0 | 0 |
| 3 | 3 | 1 | 0 | 0 | 0 | 0 |
| 4 | 4 | 1 | 0 | 1 | 0 | 0 |
| 5 | 5 | 1 | 0 | 0 | 0 | 0 |
| 6 | 6 | 1 | 0 | 0 | 0 | 0 |
| 7 | 7 | 1 | 0 | 0 | 0 | 0 |
| 8 | 0 | 1 | 0 | 0 | 0 | |
| FREE → 9 | 1 | 0 | 0 | 0 | 0 | |
| 10 | 1 | 0 | 0 | 1 | 0 | |
| 11 | 1 | 1 | 0 | 0 | 0 | |

*FIG. 8D*

CYCLE 4

| PHY REG | GPR | A | H | U | RH | L |
|---|---|---|---|---|---|---|
| 0 | 0 | 0 | 1 | 0 | 0 | 0 |
| 1 | 1 | 0 | 1 | 0 | 0 | 0 |
| 2 | 2 | 1 | 0 | 0 | 0 | 0 |
| 3 | 3 | 1 | 0 | 0 | 0 | 0 |
| 4 | 4 | 1 | 0 | 0 | 0 | 0 |
| 5 | 5 | 1 | 0 | 0 | 0 | 0 |
| 6 | 6 | 1 | 0 | 0 | 0 | 0 |
| 7 | 7 | 1 | 0 | 0 | 0 | 0 |
| 8 | 0 | 0 | 0 | 1 | 0 | |
| 9 | 0 | 1 | 0 | 1 | 0 | |
| FREE → 10 | 1 | 0 | 0 | 0 | 0 | |
| 11 | 1 | 1 | 0 | 1 | 0 | |

*FIG. 8E*

CYCLE 5

| PHY REG | GPR | A | H | U | RH | L |
|---|---|---|---|---|---|---|
| 0 | 0 | 0 | 1 | 0 | 0 | 0 |
| 1 | 1 | 0 | 1 | 0 | 0 | 0 |
| 2 | 2 | 1 | 0 | 0 | 0 | 0 |
| 3 | 3 | 1 | 0 | 0 | 0 | 0 |
| 4 | 4 | 1 | 0 | 0 | 0 | 0 |
| 5 | 5 | 1 | 0 | 0 | 0 | 0 |
| 6 | 6 | 1 | 0 | 0 | 0 | 0 |
| 7 | 7 | 1 | 0 | 0 | 0 | 0 |
| 8 | 0 | 0 | 0 | 1 | 0 | |
| 9 | 0 | 1 | 0 | 1 | 0 | |
| 10 | | | | | | |
| 11 | 1 | 1 | 0 | 1 | 0 | |

FIG. 8F

CYCLE 6

| PHY REG | GPR | A | H | U | RH | L |
|---|---|---|---|---|---|---|
| FREE → 0 | 0 | 0 | 0 | 0 | | |
| FREE → 1 | 1 | 0 | 0 | 0 | | |
| 2 | 2 | 1 | 0 | 0 | | |
| 3 | 3 | 1 | 0 | 0 | | |
| 4 | 4 | 1 | 0 | 0 | | |
| 5 | 5 | 1 | 0 | 0 | | |
| 6 | 6 | 1 | 0 | 0 | | |
| 7 | 7 | 1 | 0 | 0 | | |
| 8 | 0 | 0 | 0 | 0 | | |
| 9 | 0 | 1 | 0 | 1 | | |
| 10 | | | | | | |
| 11 | 1 | 1 | 0 | 0 | | |

FIG. 8G

APPARATUS AND METHOD FOR REDUCING THE NUMBER OF RENAME REGISTERS REQUIRED IN THE OPERATION OF A PROCESSOR

TECHNICAL FIELD

The present invention relates generally to computer architectures. More particularly, the invention relates to the architecture and use of registers within a superscalar processor. Still more particularly, the invention relates to techniques for reducing the number of rename registers required to support out-of-order execution of instructions in a superscalar architecture.

BACKGROUND OF THE INVENTION

Contemporary computing systems seek to take advantage of superscalar architectures to improve processing performance. Superscalar architectures are characterized by multiple and concurrently operable execution units integrated through a plurality of registers and control mechanisms. This allows the architecture to execute multiple instructions in an out-of-order sequence, thus utilizing parallelism to increase the throughput of the system.

Although superscalar architectures provide benefits in improving processor performance, there are numerous difficulties involved in developing practical systems. For example, the control mechanisms must manage dependencies among the data being concurrently processed by the multiple execution units. Another problem is that of mispredicted branches. When instructions are being executed out-of-order, the processor may predict the outcome of an instruction that could result in a branch in program flow. Otherwise, the processor would have to wait, or stall, until the branching instruction completed. This would reduce the effectiveness of out-of-order execution, since the benefits of parallel execution would be countered by delays in instruction issue each time an instruction is dispatched that could result in a branch. Of course, if a branch is mispredicted, then the processor must have the ability to recover to the state immediately prior to the branch so that the error can be corrected.

A variety of techniques have been devised to address these difficulties. Some of these techniques are discussed in Johnson, et al., *Superscalar Microprocessor Design*, Prentice Hall (1991). One particular technique is referred to as "register renaming."Register renaming involves forming an association between a physical register in the processor and a particular architectural, or logical, register. This relationship is referred to as a "rename pair," and is created each time an instruction writes to an architected register. The associations are maintained in a map within the processor which allows the processor to recover if a branch is mispredicted. This is explained in more detail with respect to FIG. 1.

FIG. 1 depicts a rename register map ("RMAP") which is used to track rename pairs. The RMAP includes a plurality of entries, one entry for each of n physical registers. In this case, there is shown a RMAP for a processor with 10 physical registers. Each entry in the RMAP includes an architected status bit, or "A-bit" field, or field, and an architected register field. The architected register field contains a pointer to the architected register that forms an architectural-physical pair with the physical register corresponding to the index of the entry. The A-bit indicates whether this architectural-physical pair is the most recent or not.

In conventional systems, only the A-bit is provided for in the RMAP. On dispatch, when an instruction needs a particular architected General Purpose Register ("GPR") as a source operand, the GPR pointer is compared to every architected pointer in the RMAP. Typically, the RMAP is implemented as a content addressed memory ("CAM") and the GPR pointer is applied to a read port of the CAM. If the A-bit of the matching entry is on, the corresponding output of the read port supplies the physical register pointer either in a decoded bit vector form or in a binary coded number. The output is then used to address the physical register for operand access. When an instruction that needs a target architected register is dispatched, the A-bit of the CAM entry that matched the architected target register is reset. At the same time, a new entry is assigned to form a new rename pair for the target architected register. The rename pair is formed by writing the architected GPR pointer into the next available RMAP entry corresponding to a free physical register, and setting the corresponding A-bit. The physical register pointer of the old rename pair is stored with the dispatched instruction in an instruction completion buffer. When the instruction completes, the physical register stored with the instruction is released back to the available physical register pool again. When an interruptible instruction, such as a branch instruction, is dispatched, the A column of the RMAP is stored to a table entry associated with the instruction. If the interruptible instruction causes an exception which requires a flush of the speculatively executed instructions, then the A column corresponding to the excepting instruction is retrieved and written back to the RMAP. Essentially, this restores the rename map to its state immediately prior to the execution of the interruptible instruction. For purposes of the present discussion, the term interruptible instruction refers to: (1) branch instructions, (2) speculatively executed load instructions which need to be re-executed because their execution loaded stale data, (3) instructions that can cause exceptions, and (4) instructions associated with an interrupt occurrence.

Also, as used herein, the term "interruptible point" refers to one of the following events associated with the types of interruptible instructions respectively: (1) an unresolved branch instruction which starts speculative execution along the wrong path, (2) a speculatively executed load instruction which executes ahead of the store instruction that produces its load data, (3) the execution of an instruction which causes an exception, and (4) an interrupt which occurs during execution of an instruction. An interrupt is said to occur on the occurrence of one of the above interrupt points.

However, physical registers are a limited resource on a processor. In order to sustain a higher number of active instructions, more physical registers are required. Since only a limited number of physical registers can be provided on a processor, there is a limit to the number of instructions which can be processed in parallel. Since conventional processors do not provide for reuse of physical registers until the instruction that created the rename pair completes, the practical limit is even lower. It is therefore desirable that the registers required by the operation of the processor be minimized or compressed in order to ensure that only the minimum number of physical registers are in use at a given time.

SUMMARY OF THE INVENTION

One aspect of the invention relates to a method for operating a processor. In one embodiment, the method comprises the steps of dispatching an instruction; determining a presently architected RMAP entry for the architectural register targeted by the dispatched instruction; selecting the RMAP entries which are associated with physical registers that contain operands for the dispatched instruction; updating a use indicator in the selected RMAP entries; determining whether the dispatched instruction is interruptible; and updating an architectural indicator and an historical indicator in the presently architected RMAP entry.

Another aspect of the invention relates to an apparatus for maintaining the state of a processor having a plurality of physical registers and a rename register map ("RMAP") which stores rename pairs that associate architected and physical registers, the rename register map having a plurality of entries which are associated with the physical registers, individual entries having an architected register field, an architected status bit and a history status bit. In one embodiment, the apparatus comprises means for dispatching an instruction; means for determining a presently architected RMAP entry for the architectural register targeted by the dispatched instruction; means for selecting the RMAP entries which are associated with physical registers that contain operands for the dispatched instruction; means for updating a use indicator in the selected RMAP entries; means for determining whether the dispatched instruction is interruptible; and means for updating an architectural indicator and a historical indicator in the presently architected RMAP entry.

BRIEF DESCRIPTION OF DRAWINGS

FIG. 4 depicts the logical contents of an interruptible instruction table useful according to embodiments of the invention.

FIG. 5 depicts a logical vector according to an embodiment of the invention.

FIG. 6 is a block diagram of a processor useful in accordance with embodiments of the present invention.

FIG. 7 is a schematic diagram of a circuit for controlling bits in the RMAP which indicates whether a particular entry is required as an operand.

FIGS. 8A–8G illustrate the operation of an RMAP table as it operates according to an embodiment of the invention.

DETAILED DESCRIPTION OF EMBODIMENTS OF THE INVENTION

Figures 1, 1A, 2:
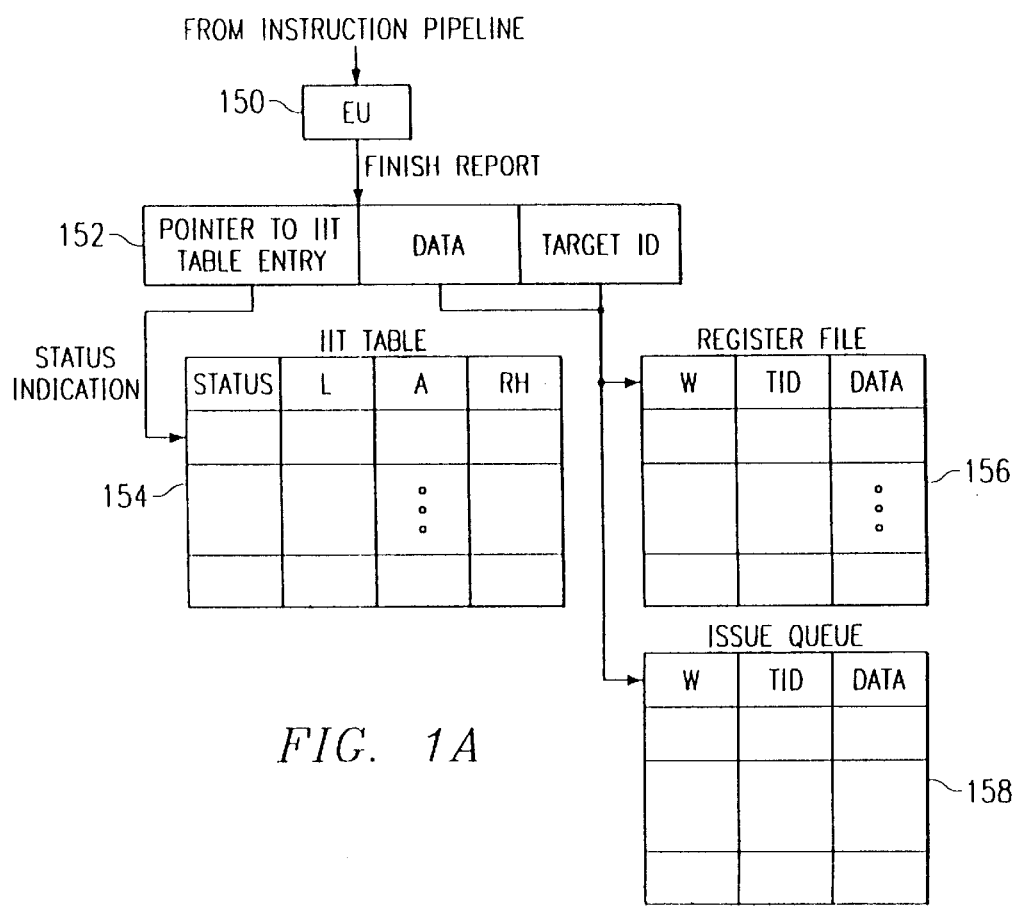
FIG. 1 depicts the logical contents of a conventional rename register map.
FIG. 1A is a data flow diagram illustrating the flow of data upon completion of an instruction according to an embodiment of the invention.
FIG. 2 depicts the logical contents of a rename register map according to an embodiment of the invention.

Embodiments of the present invention will be described with respect to the exemplary PowerPC Architecture, which is described in detail in publications such as the "*PowerPC 603 Risc Microprocessor Technical Summary*," available from IBM as Order No. MPR603TSU-03. However, those of skill in the art will recognize that this is for purposes of illustration only and the present invention is readily adaptable to numerous other superscalar processor architectures. A processor system useful for practicing embodiments of the invention is described with respect to FIG. 3.

FIG. 6 is a block diagram of a processor 10 system for processing information according to an embodiment of the invention. In this embodiment, processor 10 is a single integrated circuit superscalar microprocessor. Accordingly, as discussed further hereinbelow, processor 10 includes various units, registers, buffers, memories, and other sections, all of which are formed by integrated circuitry. As shown in FIG. 6, a system bus 11 is connected to a bus interface unit ("BIU") 12 of processor 10. BIU 12 controls the transfer of information between processor 10 and system bus 11.

BIU 12 is connected to an instruction cache 14 and to a data cache 16 of processor 10. Instruction cache 14 outputs instructions to an instruction fetch unit 18. In response to such instructions from instruction cache 14, fetch unit 18 passes instructions to decode/dispatch unit 20 which, in turn, decodes and outputs instructions to other execution circuitry of processor 10.

The execution circuitry of processor 10 includes multiple execution units, also referred to herein as functional units, and shown in the figure as functional units 22a–22d. These functional units include, for example, floating point, fixed point and load/store units, which are conventional in the art.

Processor 10 also contains a branch unit 24 which receives branch instructions from the fetch unit 18 and performs look ahead operations on conditional branches to resolve them as soon as possible. The branch unit 24 predicts the direction of the conditional branch. Therefore, when an unresolved conditional branch instruction is encountered, the processor 10 fetches instructions from the predicted target stream until the conditional branch is resolved.

Processor 10 also includes a reservation station 26. Reservation station 26 holds instructions until all source data is available and the instructions can be issued to the functional units.

Completion/flush logic 28 retires executed instructions. Completion/flush logic 28 recognizes exception conditions and discards any operations being performed on subsequent instructions in program order. Moreover, in the event of a mispredicted branch, completion/flush logic 28 flushes instructions which are in various stages of being processed by the processor 10 and allows the decode/dispatch unit 20 to begin dispatching from the correct path. Completion/flush logic 28 also receives a signal indicating the receipt of external interrupts which can affect program flow through the processor 10.

Register file 30 provides the physical registers for storing instruction results and operands. Although different architectures exist, the present invention will be described with respect to a unified architected and rename register space, i.e., the architected registers and rename registers are located in the same register file. Whether a physical register is functioning as a rename or an architected register is determined by a status bit associated with the physical register. Register file 30 receives result data from functional units 22a–22d and outputs register data to reservation station 26.

Processor 10 achieves high performance by processing multiple instructions simultaneously at various ones of execution units 22a–22d. Accordingly, each instruction is processed as a sequence of stages, each being executable in parallel with stages of other instructions. The technique of implementing a sequence of stages is called "pipelining" and is conventional in the art. An instruction is normally processed in stages, for example, fetch, decode, dispatch, issue, execute and completion.

In the fetch stage, fetch unit 18 inputs from instruction cache 14 one or more instructions from one or more memory addresses in memory 34 which store the sequence of instructions.

In the decode stage, decode/dispatch unit 20 decodes up to four fetched instructions. In the dispatch stage, decode/dispatch unit 20 selectively dispatches up to four decoded instructions to reservation station 26 after reserving register file entries for the dispatched instructions' results (destination operands). In the dispatch stage, operand information is supplied to reservation station 26 for dispatched instructions. Processor 10 dispatches instructions in program order. In the issue stage, processor 10 issues instructions with available data from reservation station 26 to selected execution units 20a–22d.

In the execute stage, execution units execute their issued instructions and output results of their operations for storage at selected entries in register files. In this manner, processor 10 is able to execute instructions out-of-order relative to their programmed sequence.

In the completion stage, the functional units and the branch unit signal completion/flush logic 28 that an instruction is "complete". Processor 10 "completes" instructions in order of their programmed sequence.

Referring now to FIG. 2, there is shown a representation of a rename register map ("RMAP") according to an embodiment of the invention. In practice, the RMAP is implemented as a content addressable memory ("CAM") with associated status bits. The RMAP contains a number of entries, wherein each entry corresponds to a physical register. As shown, each entry of the RMAP includes a plurality of fields. In this example, the RMAP contains a general purpose register ("GPR") field, an A-bit field, a U-bit field, and a "history" or H-bit field (also referred to as a history status bit). The RMAP also includes a target instruction identifier ("TID") field. The GPR and A-bit fields operate in a manner similar to that of conventional architectures. Specifically, the GPR field contains the pointer of the architected register that forms an architectural-physical pair with the physical register corresponding to the index of the entry. The A-bit field contains a bit which indicates whether the physical register corresponding to the index of the entry has been allocated to contain the most recent value to be written to the architected register.

The TID field contains a unique ID, preferably 6–8 bits in length, that is assigned to each dispatched instruction. If an instruction has two targets, two TIDs will be assigned. The TID is passed to the execution unit and will be used to guide data back to the physical register location and dependent instructions. The TID prevents writeback of data to a target that has already been made available for re-use. In other words, the compression that this invention allows may create a situation in which two active instructions have the same physical register target. The use of TIDs resolves this problem. This is described in greater detail with respect to FIG. 1A.

Referring now to FIG. 1A, when an interruptible instruction is dispatched, an entry is created in the interrupt instruction table ("IIT") 154. When the operands for the instruction become available, they are passed from the instruction pipeline to the appropriate execution unit 150 which performs the required operation. The execution unit 150 is designed, according to known techniques, to detect whether the instruction completes without generating an exception due to an error condition. When the execution unit 150 finishes operating on the instruction, it generates a finish report. The finish report indicates to other resources on the processor whether the instruction was satisfactorily executed by the execution unit 150, or whether an error condition arose requiring the generation of an exception. For purposes of illustration, it will be assumed that no exceptions occurred during the execution of the instruction. In this case, the execution unit 150 generates a finish report which includes the information shown in the finish report block 152. The finish report 152 includes a pointer to the interruptible instruction table entry which was created upon dispatch of the instruction that has now executed. This pointer is used to set the status bits in the IIT 154 corresponding entry in the interruptible section table 154 to indicate that the instruction has satisfactorily completed. It will be noted that if there is an abnormal completion, then the status bits are used to indicate the type of abnormality. Different types of abnormalities may occur depending on the architecture used, and thus, the status indication will be largely a matter of design choice depending upon the architecture.

The finish report 152 also includes the data generated by the execution unit 150 in accordance with the instruction operands, and the target ID for the architectural register targeted by the instruction. The processor matches the target ID in the finish report with target ID fields in the register file 156 and the issue queue 158 When a match is found, the processor writes the data from the finish report into the data field of the corresponding entry in the register file 156 and/or issue queue 158. Entries in the register file 156 and issue queues 158 are provided with a bit to indicate whether the information contained in the entry is valid. This is shown in the figure as a W-bit. Note that in this embodiment of the invention, the term issue queue is also used for the reservation station, therefore, issue queue 158 is the same as reservation station 26 shown in FIG. 7.

This technique prevents instructions from improperly updating an entry in the register file, while simultaneously allowing all instructions to receive their required operand data. For example, assume two instructions are issued, instruction 1 and instruction 2, in that order. Each instruction targets the same architectural register. Assume further that instruction 2 completes before instruction 1. In this case, the TID field in the register file 156 corresponding to the targeted architectural register, will be updated with the TID of instruction 2. When instruction 1 completes, its TID will not match the TID for the targeted architectural register, and therefore register file 156 will not be updated with stale data from instruction 1. At the same time, any instructions which issued and require data from instruction 1 as a source operand, are maintained in the issue queue 158. In this case, the TID of instruction 1 will match the TID for any instructions in the issue queue 158 which require operand data from instruction 1. When the processor finds a match, the data from the finish report is written into the corresponding data field and instruction queue 158. Thus, although the data generated by instruction 1 is never written into a physical register in the register file, it is nevertheless available for any issued instructions which require it as operand data.

The H-bit field contains a bit which indicates whether the physical register corresponding to the index of the entry is kept for recovery due to speculative execution that may be abandoned. The operation of this bit will be described in greater detail herein. It is noted that A and H will not both be set at the same time.

The U-bit field contains a bit which indicates whether the RMAP entry is required, or "used", by another instruction to obtain operand data. The operation of the U-bit will be described in greater detail herein.

The invention also makes use of two vectors, i.e., a logical register, or "L-vector," and a running H, or "RH-vector". The L-vector comprises an n-bit register, where n is the number of architected registers available on the processor. An L-vector for a processor having four architected registers is shown in FIG. 5. The RH-vector records which physical registers are added to the history space during the dispatch of each interruptible group (i.e., group of instructions between interruptible instructions). This is similar to the L-vector, but the L-vector tracks the architected registers instead. The RH- and L-vectors are stored in the IIT, similar to the A-bit vector. An IIT having entries for the RH- and L-vectors is shown in FIG. 4. Upon completion of an interruptible group, the bits in the RH-vector select which H-bits to reset in the register map. On a flush, the RH-bits for those interruptible groups that are being purged designate which H-bits to reset. By tracking the H-bits set during dispatch of an interruptible group, this version of the invention eliminates the need for additional recovery logic.

An instruction is ready to complete when all instructions dispatched prior to it, and itself, have executed, generated results, and their execution does not generate an exception or is not interrupted. The processor state at a given point of execution in an in-order-execution processor is defined collectively by the contents of architected registers at the completion of the last instruction execution. When a register is written, the processor changes to a new state. The new state differs from the old state by the new and old values of the register written.

As stated previously, embodiments of the invention will be described with respect to a unified architected-rename register space, i.e., the architected register and rename registers are located in the same register file and, whether a physical register is functioning as a rename or architected register is determined by a status bit associated with the physical register. The number of physical registers is greater than the number of architected registers implemented. A map is initialized at power-on reset so that each architected register is associated with a physical register. Whenever an instruction that writes to an architected register is dispatched, a new physical register is associated with the architected register so that the data written by the most recent instruction will be deposited in the new physical register. Any subsequent instruction that reads the operand from the particular architected register will obtain it from the new physical register.

In out-of-order execution processors, only the processor state at an interrupt point is of interest. For a processor that executes out-of-order, the occurrence of an interrupt forces the processor to recover to its known state before the interrupt point. Thus, the architected-physical association pairs ("rename pairs") must be saved before each interrupt point to allow the processor to recover to the known state if necessary. Also, in out-of-order execution, instructions are speculatively dispatched. When instructions need to write to an architected register, the rename pair is established speculatively if there is an outstanding interrupting instruction that has not completed. When a new rename pair is established, the older pair is kept until the instruction that established the newer pair successfully completes without exception or without being interrupted. At such time, the physical register in the older rename pair is recycled for re-use with further instructions. Speculatively established rename pairs will also be nullified when an interruptible instruction causes an interrupt. In such cases, all physical registers of the speculatively established pairs are recycled for reuse.

Recovery to the state prior to an interrupt point does not require the rename pairs for all existing instructions. At each interrupt point, the architected state of a processor is defined by the last instructions that write to each architected register. Therefore, only the rename pairs established by these instructions need to be kept. In other words, whenever a rename pair is allocated for a dispatched instruction, the last rename pair of the architected register can be released as long as it is not needed for recovery at the interrupt point and subsequent instructions that need the physical register content as an operand already have obtained it or have the means to obtain it.

Thus, the status of an RMAP entry is determined from the A, H and U-bits according to the following table:

| A | H | U | Status |
|---|---|---|---|
| 0 | 0 | 0 | Free physical register |
| 0 | 1 | X | Physical register saved for recovery |
| 1 | 0 | X | Architected to contain most recent target data |
| 0 | 0 | 1 | Required as source operand |
| 1 | 1 | X | Illegal State | where "X" indicates a don't care status.

Figure 3:
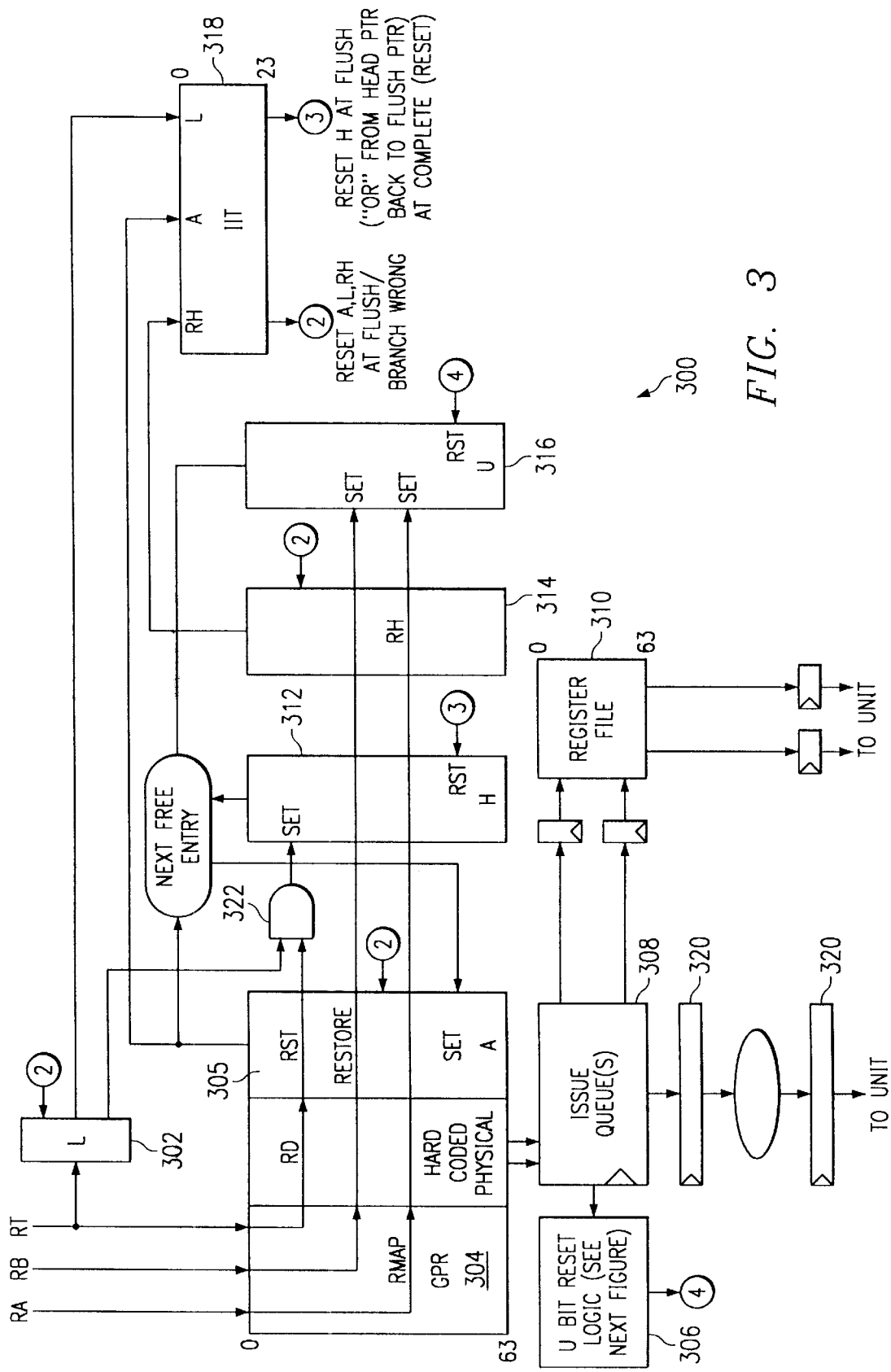
FIG. 3 is a block diagram illustrating the dataflow through a processor according to an embodiment of the invention.

FIG. 3 shows a data flow diagram for a processor according to one embodiment of the invention. In this case, the processor is provided with an RMAP 304 which receives signals RA, RB and RT which are architected register pointers to the first operand, second operand and target architectural registers, respectively, used by a dispatched instruction. These signals are generated by suitable decoded dispatch logic (not shown) which determines registers used by the instruction. Signals RA and RB are also provided to logic 316 which sets and resets the U-bits in the RMAP entries as will be described in greater detail herein. Signal RT is also provided to RMAP 304 and to logic 312 which sets and resets the H-bits of the entries in the RMAP 304. According to embodiments of the invention, the H-bit of a particular RMAP entry is not set unless a signal is provided on RT indicating that a particular architectural register is targeted, and a signal is provided from L-vector 302 to H-bit control logic 312, in this case a latch, through AND gate 322 indicating the bit in the L-vector corresponding to the targeted architectural register is set.

Signals are also provided from the L-vector 302, the A-bit column of the RMAP 304 and the RH-vector to entries in the interruptible instruction table ("IIT") 318. The IIT 318 is sometimes referred to as the completion table. New entries for these vectors are created in the IIT table 318 upon the dispatch of each interruptible instruction. The data saved in the IIT 318 allows the requisite L and RH-vectors, along with the A-bit and H-bit columns to be correctly restored to a previous machine state upon the generation of an exception by an instruction during its execution. The logical structure of an n-entry IIT is shown in FIG. 4.

RMAP 304 is also connected to issue queues 308, sometimes referred to as reservation stations, which issue the instructions to functional units 320 of the processor. Issue queues 308 are provided with signal lines to transfer data between the registers in the register file 310, as discussed previously. Issue queue 308 is also connected to U-bit reset logic 306. Exemplary U-bit reset logic will be described with respect to FIG. 7. U-bit reset logic 306 is connected to U-bit control logic 316 to allow resetting of the U-bits of the RMAP 304.

On dispatch, only an interruptible instruction creates a new entry in the IIT. In one embodiment, the IIT 318 is implemented as a FIFO structure. The A-vector and the L-vector at the time of dispatch are entered in the field of a new entry in the IIT 318. When an IIT entry becomes the "head," i.e. the oldest entry, of the FIFO queue, and a functional unit reports execution of an instruction without exception, the IIT entry is ready to commit the instruction and release the resources held by instructions prior to the interruptible instruction. When the instruction of the IIT entry reports a flush condition, the IIT control logic sends the A-vector to the RMAP 304, and the L-vector to the L-vector register 302. The IIT entry that causes the flush becomes the next free IIT entry.

More specifically, the control logic for the IIT 318 has a first output 2 which allows the A, L and RH-vectors stored in a particular IIT table entry to be passed to the A, L and RH latches 305, 302 and 314, respectively, on a bit-wise basis. It will be appreciated that although each of the A, L and RH fields in the IIT contains a multiplicity of bits, only one latch for a single bit in each of the fields is shown for the sake of simplicity. Thus, in the event of a flush, the A, L and RH-vectors stored in an IIT table entry for an instruction dispatched previous to the instruction that generated the exception may be retrieved from the IIT and used to recover the processor state prior to the excepting instruction by restoring the bit patterns in latches 302, 305 and 314.

A second output 3 is provided from the IIT 318 which is used to reset the H column in the RMAP, which in this embodiment is stored in latches 312. Again, it will be appreciated that only one latch 312 for one bit in the H column of the RMAP is shown for the sake of simplicity. When an instruction completes, the RH field in the IIT 318 is bit-wise inverted, then used as a mask reset vector to reset the bits in the H column of the RMAP. The mask reset vector is then bit-wise ANDed with the H column of the RMAP. This means that for any physical register for which a corresponding bit in the RH-vector was set at the time an instruction completes, the corresponding H-bit in the RMAP will be cleared, thus releasing the physical register for re-use by subsequently dispatched instructions. This will be described in still further detail herein.

The H-bit is also maintained in the same manner as discussed previously. A separate L-bit vector indicates, for each architected register, whether that GPR has a history copy for the current interrupt group. If this architected register does not have a history copy, then the entry that has the A-bit reset also has its H-bit set. At the same time, the L-bit for this architected register is set. If the L-bit is already set, then there is already a history copy saved in a physical register for the architected register. Accordingly, in this case the A-bit is reset, but the H-bit is left inactive, since this physical register will not be needed for recovery.

The U-bit indicates that some dependent instruction needs this physical register as a source operand. At dispatch, each instruction marks the physical registers containing the source operands as "used" by setting the U-bits with the associated RMAP entries. Each cycle, the issue queue provides a bit vector that tells the RMAP what U-bits to reset.

The issue queues generate this vector by decoding each source rename pointer, bitwise ORing these decoded pointers, and then inverting this bus. This causes the U-bit for each RMAP entry that is not a source for any instruction in the issue queue to reset. A circuit for operating the U-bits according to an embodiment of the invention is shown in FIG. 7.

Figures 7, 8A:
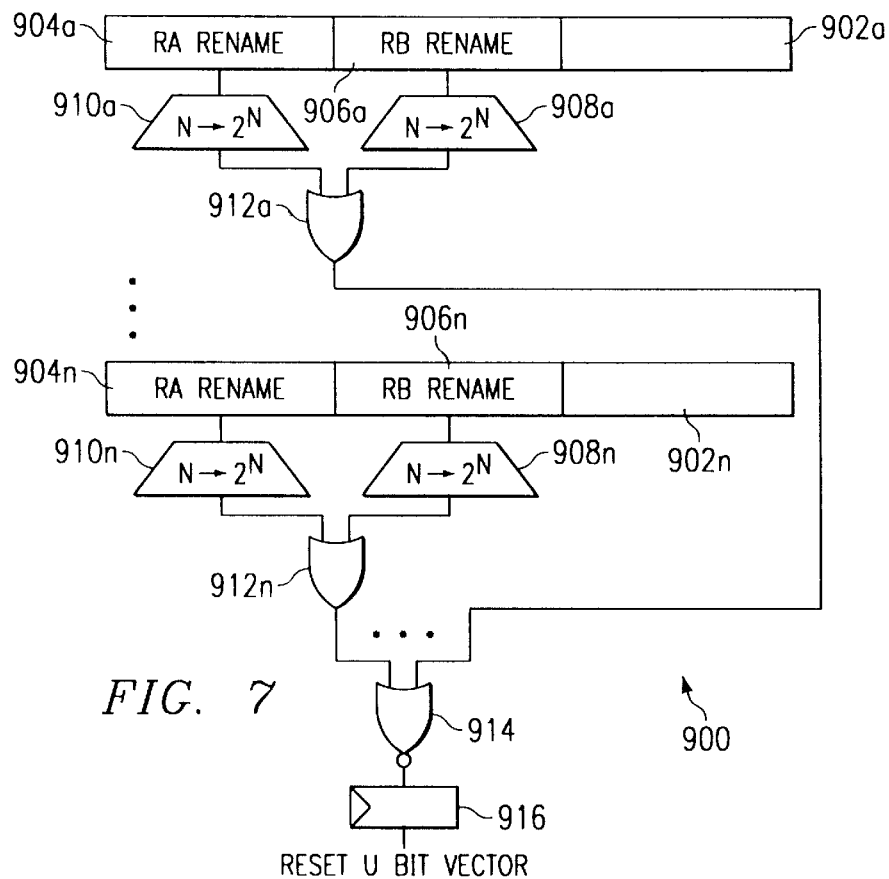

In the embodiment shown in FIG. 7, the issue queue contains a plurality of entries 902a–902n for storing, inter alia, the rename registers which contain, or will contain, the operand data required for the instruction to issue. For example, the instruction stored in issue queue entry 902a may require up to two operands, A and B, for execution. Field 904a contains a pointer to the physical register which will provide operand A, while field 906a contains a pointer to the physical register which will provide operand B. Similarly, for issue queue 902n, fields 904n and 906n contain pointers to the physical registers which will provide operands A and B for the instruction stored in issue queue entry 902n, respectively.

For each entry in the issue queue, the bit pattern stored in the operand rename fields is decoded and then bitwise ORed, and the resulting signal is later inverted. For example, the rename pointer stored in field 904a of issue queue entry 902a is provided to decoder 910a, and the bit pattern stored in rename register field 906a of issue queue 902a is provided to decoder 908a. Each of the pairs of outputs of decoder 908a and 910a are provided to OR gates 912a. The OR gates of 912a are later provided to NOR gates 914. The output of NOR gates 914 are then stored in latches 916 which provide signals which reset the corresponding U-bits. Similarly, rename register fields 904n and 906n of issue queue entry 902n are connected to decoders 910n and 908n, respectively. The outputs of decoders 908n and 910n are provided to OR gates 912n whose outputs are then provided to NOR gates 914. The sum of all the signals of all the OR gates for each entry in the issue queue are NORed by NOR gates 914.

A physical register is considered free if its A, H and U-bits are all inactive. According to the convention used herein, a bit is inactive if it is reset, i.e. logical 0. Use of these bits according to embodiments of the invention allows registers that are not the most recent references to an architected register, are not needed for state recovery, and are not needed as sources for other operations to be re-used before they have reached the in-order completion point.

The following code sequence is used to illustrate the operation of an embodiment of the invention. Six instructions are dispatched in the following order:

(1) load R0

(2) add R1, R1, R2

(3) add R1, R1, R3

(4) add R1, R1, R4

(5) add R0, R0, R1

(6) store R0

According to convention used herein, "R" is used to refer to "GPR". Thus, R0 identifies GPR0. Also, in the instruction notation, the first GPR from the left is the target and subsequent GPRs are operands. It will be assumed that two machines run this code; both machines have twelve rename registers; initially eight of these renames are used for the eight architected registers. Machine A uses the traditional "release on completion" scheme, machine B uses a method for rename management according to an embodiment of the present invention. Both machines dispatch two instructions a cycle, issue two instructions a cycle, execute two instructions a cycle, and complete two instructions a cycle. It will further be assumed that the load takes three cycles, and the store and adds take one cycle in execute, and that there are sufficient queue entries to hold dispatched instructions. The following table illustrates how machine A using a "release on completion" scheme would execute the exemplary code sequence.

the example above. The operation of the invention in executing the above exemplary instructions will be described in still greater detail with respect to FIGS. 8A–8G.

FIGS. 8A–8G illustrate the contents of the RMAP, RH-vector and L-vector through cycles 0–6 of the execution of the exemplary instructions described above. FIG. 8A

| Cycle | Dispatch | Issue | Execute | Completion | Renames Available at end of cycle | Renames stop disp? |
|---|---|---|---|---|---|---|
| 1 | load R0<br>add R1, R1, R2 | | | | 2 | |
| 2 | add R1, R1, R3<br>add R1, R1, R4 | load R0<br>add R1, R1, R2 | | | 0 | |
| 3 | | add R1, R1, R3 | load R0<br>add R1, R1, R2 | | 0 | Yes |
| 4 | | add R1, R1, R4 | load R0<br>add R1, R1, R3 | | 0 | Yes |
| 5 | | | load R0<br>add R1, R1, R4 | | 0 | Yes |
| 6 | | | | load R0<br>add R1, R1, R2 | 2 | Yes |
| 7 | add R0, R0, R1<br>store R0 | | | add R1, R1, R3<br>add R1, R1, R4 | 3 | |
| 8 | | add R0, R0, R1 | | | 3 | |
| 9 | | store R0 | add R0, R0, R1 | | 3 | |
| 10 | | | store R0 | add R0, R0, R1 | 4 | |
| 11 | | | | store R0 | 4 | |

By contrast, the same instructions executed on machine B according to an embodiment of the invention produces the following results:

shows the state of the machine during cycle 0, i.e., before the dispatch of instruction 1. At this time, physical registers 0–7 are designated as architected registers 0–7, respectively.

| Cycle | Dispatch | Issue | Execute | Completion | Renames Available at end of cycle | Renames stop disp? |
|---|---|---|---|---|---|---|
| 1 | load R0<br>add R1, R1, R2 | | | | 2 | |
| 2 | add R1, R1, R3<br>add R1, R1, R4 | load R0<br>add R1, R1, R2 | | | 0 | |
| 3 | | add R1, R1, R3 | load R0<br>add R1, R1, R2 | | 1 | Yes |
| 4 | Add R0, R0, R1<br>Store R0 | add R1, R1, R4 | load R0<br>add R1, R1, R3 | | 1 | |
| 5 | | | load R0<br>add R1, R1, R4 | | 1 | |
| 6 | | add R0, R0, R1 | | load R0<br>add R1, R1, R2 | 4 | |
| 7 | | store R0 | add R0, R0, R1 | add R1, R1, R3<br>add R1, R1, R4 | 4 | |
| 8 | | | store R0 | add R0, R0, R1 | 4 | |
| 9 | | | | store R0 | 4 | |

As seen from the above tables, a processor executing the exemplary code sequence, without benefit of the present invention, exhausts its rename registers at end of cycle 2 and, therefore, must stop dispatch of further instructions. Moreover, dispatch remains stalled until the end of cycle 6 at which time only two rename registers become available.

By contrast, even though the available rename registers are exhausted at the end of cycle 2, a processor according to the present invention recycles at least one rename register in each of cycles 3, 4 and 5. Thus, in the present invention dispatch is stalled only for one cycle. Moreover, four renames are available at the end of cycle 6, instead of 2 in Accordingly, the A-bit is set for each of entries 0–7 in the RMAP. Also, the H-bits, U-bits, RH-vector and L-vector are all clear at cycle 0. RMAP entries 8–11 are free and are available for use by any subsequently dispatched instruction.

FIG. 8B shows the state of the machine at the end of cycle 1. In cycle 1, the first two instructions of the instruction group, i.e., load R0 and add R1, R1, R2, are dispatched. The dispatching of instruction 1 clears the A-bit and sets the H-bit in RMAP entry 0. It also causes a pointer to GPR0 to be written into the architected register field, and sets the A-bit in RMAP entry 8. Additionally, dispatch of instruction 1 causes the L-vector bit 0 corresponding to GPR0 to set.

The setting of L-vector bit 0 indicates that RMAP control logic has preserved, for possible recovery, a physical register which forms the youngest, i.e., most recently created, rename pair with architected register GPR0 prior to the youngest interruptible instruction. The operations on the A-bit, H-bit and L-vector have been described in detail previously. Since, at this time, no dispatched instruction requires GPR0 as an operand, the U-bit in entry 0 of the RMAP is not set. Bit 0 in the RH-vector, which, by convention, corresponds to physical register 0, is set to indicate that the contents of physical register 0 are preserved in H space, i.e., the corresponding H-bit has been set during the dispatch of the current interrupt group beginning with the dispatch of instruction 1. Physical register 0 may need to be restored as architected GPR0 in case the load R0 instruction causes an interrupt.

The dispatch of instruction 2, i.e., add R1, R1, R2, clears the A-bit and sets the H-bit in entry 1 of the RMAP. It also sets bit 1 in the L-vector which corresponds to GPR1. The setting of L-vector bit 1 indicates that RMAP control logic has saved, for possible recovery, a physical register which forms the youngest renamed pair with architected register GPR1 prior to the youngest interruptible instruction. Since instruction 2 targets GPR1, a pointer to GPR1 is written in the architected register field of the next available RMAP entry, in this case entry 9, and the corresponding A-bit is set. Since the data in physical register 1 is identified as an operand required by instruction 2, the U-bit in RMAP entry 1 is set. Similarly, bits 0 and 1 in the RH-vector are set to indicate that the contents of physical registers 1 and 2 are preserved in H space during the dispatch of the present interruptible group which include instructions load R0 and add R1, R1, R2.

FIG. 8C illustrates the state of the processor at the end of cycle 2. By the end of cycle 2, it is seen that instructions 3 and 4, i.e., add R1, R1, R3 and add R1, R1, R4, respectively, have been dispatched, and instructions 1 and 2 have been scheduled for issue. Instructions 3 and 4 update the next available RMAP entries at the time of dispatch by writing a pointer to the targeted architected register, and setting the A-bit. In this case, the next available entries for instructions 3 and 4 are entries 10 and 11, respectively. It will be noted that, for entry 10, the A-bit and the H-bit are both cleared. As discussed previously, this is because instructions 3 and 4 both target GPR1. Since instruction 4 is dispatched subsequently to instruction 3, the A-bit in the RMAP entry associated with instruction 3, i.e., RMAP entry 10, is reset. The H-bit in RMAP entry 10 is not set in this case because the bit in the L-vector (bit 1) corresponding to GPR1 has been set by the dispatch of a previous instruction. The A and H-bits of entry 9 are reset because (1) a new physical register is assigned to the architected register GPR1 to hold the latest target, and (2) the physical register of the renamed pair with GPR1 prior to the youngest interruptible instruction has been preserved in the H space for possible recovery. Condition (1) causes the A-bit to reset, and condition (2) causes the H-bit not to be set. Physical register 9 no longer provides the latest value for source operands and is not needed for recovery.

Since instruction 3 requires the data stored in GPR1 as an operand, and since the most recent instruction which writes to GPR1, relative to the dispatch of instruction 3, is instruction 2, the U-bit in the RMAP entry associated with instruction 2, i.e., RMAP entry 9, is set. This, of course, indicates that the data in physical register 9 is required by an instruction, in this case, instruction 3. At this point, it is seen that there are no entries in the RMAP table which are available for use by any further instructions. Thus, dispatch of instructions is stalled at the end of cycle 2.

FIG. 8D illustrates the state of the processor at the end of cycle 3. Since there were no available RMAP entries at the end of cycle 2, no new instructions will be dispatched in cycle 3. However, instruction 3 will be scheduled for issue while instructions 1 and 2 execute. It will be recalled that instruction 3 requires the result of instruction 2 (GPR1 and physical register 9) as an operand. Since instruction 3 is now in the issue queue, and since instruction 2 is being executed, the U-bit for physical register 9 may now be cleared because it is assured that instruction 3 will receive the required operand, even if the physical register used to store the result of instruction 2 is overwritten in the subsequent machine cycle. This is because the result of instruction 2 is written directly into the issue queue from the result bus. Thus, the RMAP entry associated with instruction 2, i.e., RMAP entry 9, has its U-bit cleared by operation of the circuit shown in FIG. 9, as discussed previously. From the table, it is seen that for RMAP entry 9, the A, H, and U-bits are all cleared at the end of cycle 3. Thus, physical register 9 is now available for use by a subsequently dispatched instruction, and, accordingly, dispatch may now resume in cycle 4. Without the use of U-bit, the processor would be forced to wait until cycle 6 when instruction 2 completes.

FIG. 8E illustrates the state of the processor at the end of cycle 4. In this case, it is seen that the dispatch of instruction 5 takes advantage of physical register 9 which was made available for use in cycle 3 as explained previously. Thus, instruction 5, which targets GPR0, writes a pointer to GPR0 in the GPR field of RMAP entry 9, and sets the A-bit. Instruction 6 is also dispatched. Since instruction 6 requires the result of instruction 5 for execution, the dispatch of instruction 6 results in the setting of the U-bit of RMAP entry 9.

Also in cycle 4, instruction 4 passes to issue and instruction 3 begins execution. Since the result of instruction 3 is required as an operand in instruction 4, and since instruction 4 is now in the issue queue, the U-bit for the RMAP entry associated with instruction 4, i.e., RMAP entry 10, is cleared. This frees up physical register 10 for use by a subsequently dispatched instruction. In this example, no new instructions are dispatched in cycles 5–9, although it will be understood that this is for purposes of illustration only, and in practical applications, additional instructions could be dispatched because physical registers are available for use as indicated by the RMAP shown in FIG. 8E.

Also, it will be noted that instruction 6, i.e., store GPR0, is an interruptible instruction, and thus, upon its dispatch, a new interruptible group is started. Therefore, the RH-vector and L-vector associated with the RMAP table at this point during program flow, are cleared. The RH and L-vectors from cycle 3 are saved in the entry in the IIT associated with the last dispatched interruptible instruction.

FIG. 8F illustrates the state of the processor at the end of cycle 5. In this case, instructions 1 and 4 are still executing, no new instructions have been dispatched, and no instructions have yet passed through the completion stage. Thus, RMAP entry 10 remains available for use, but no other changes are made to the RMAP.

Finally, FIG. 8G illustrates the state of the processor at the end of cycle 6. At this time, instruction 5, using physical GPR entry 8 as the target, progresses to the issue queue and instructions 1 and 2 complete. Thus, the U-bit in entry 8 is reset, making entry 8 available for use by subsequently dispatched instructions. Also, since instructions 1 and 2 are completed without exception, the data stored in physical registers 0 and 1 may be removed from H space, thus the H-bits in RMAP entries 0 and 1 are reset. At this point, it is seen that four physical registers, i.e., 0, 1, 8 and 10 are now available for use by subsequently dispatched instructions. This compares with only two available physical registers at the end of cycle 6 in a processor which is not equipped with the advantages of the present invention.

Figure 9A:
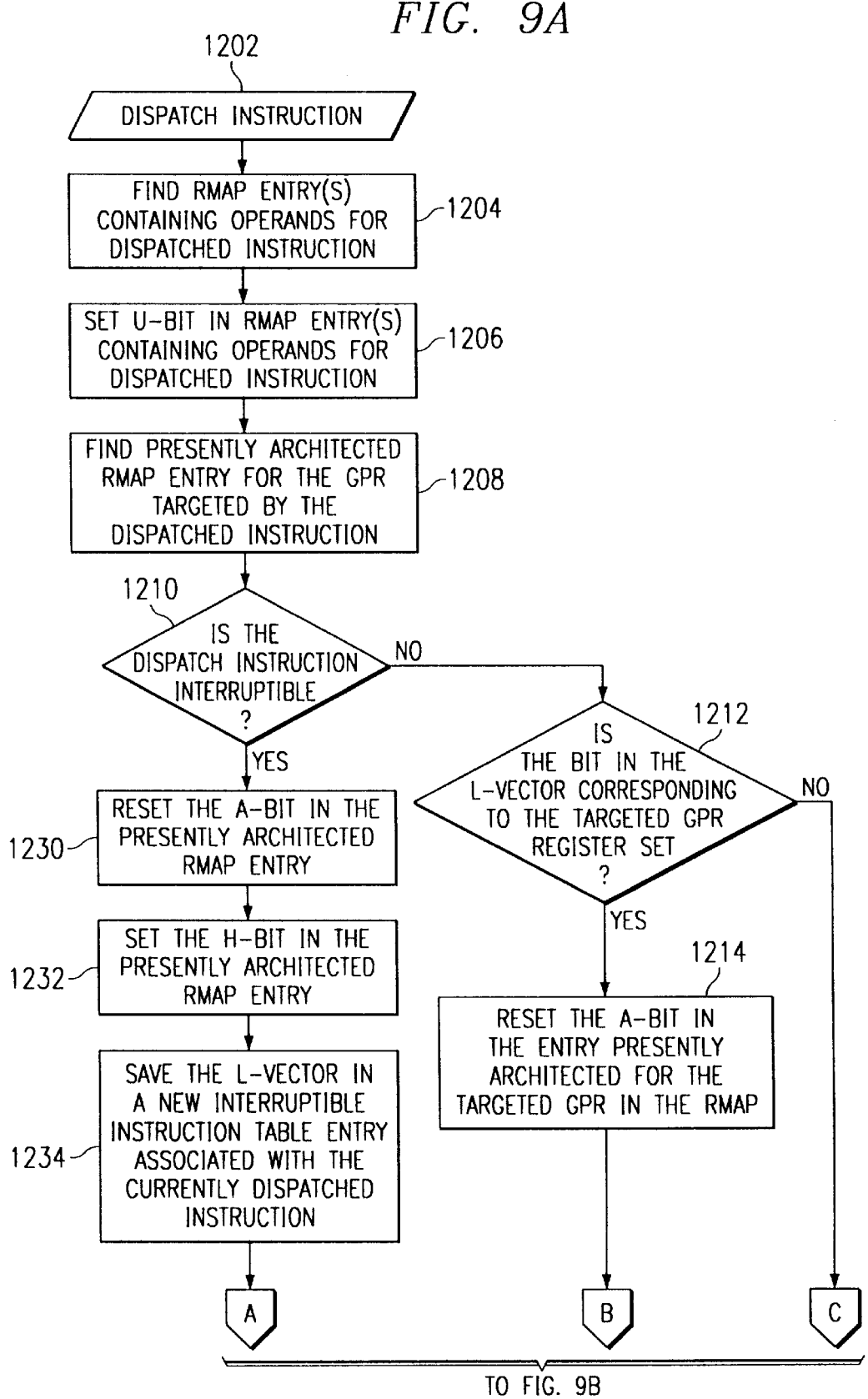
FIG. 9 is a flow chart illustrating the operation of an embodiment of the invention.
Figure 9B:
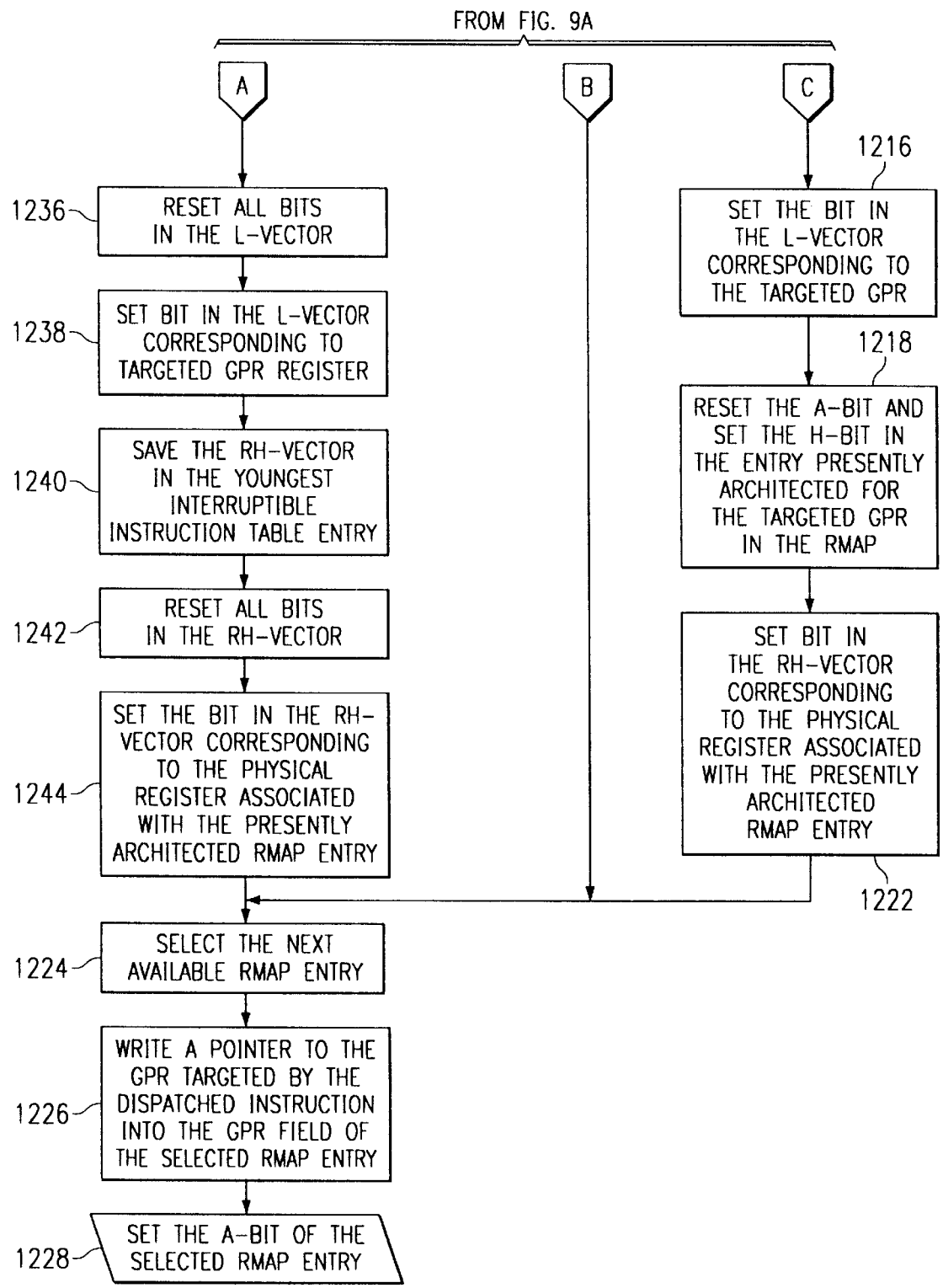

FIG. 9 is a flow chart 900 illustrating the operation of an embodiment of the invention in still further detail. In this embodiment, an instruction is dispatched in step 1202. Upon dispatch, the processor proceeds to step 1204 and searches the RMAP for the entry, or entries, which contain the operands for the dispatched instruction. Preceding to step 1206, the processor then sets U-bit in the RMAP entry, or entries, which contain the operands for the dispatched instruction. This informs the processor that the data stored in the corresponding physical registers must be saved until the dispatched instruction reaches the issue queue.

In step 1208, the processor finds the presently architected RMAP entry for the GPR targeted by the dispatched instruction. Next, in step 1210, the processor determines whether the dispatched instruction is interruptible. If so, flow proceeds to steps 1230–1244 which cause the processor to reset the A-bit in the presently architected RMAP entry, set the H-bit in the RMAP entry and reset all bits in the L-vector after first saving a copy of the L-vector in the IIT. In step 1242, the processor now resets all bits in the RH-vector. This indicates that a new group of interruptible instructions is now being processed by the machine. In step 1244, the processor then sets the bit in the RH-vector which corresponds to the physical register associated with the presently architected RMAP entry. This indicates that the physical register associated with the presently architected RMAP entry has been saved to H space during the dispatch of the present interruptible group. The processor then proceeds to step 1224 where it selects the next available RMAP entry. Afterwards, the processor then writes a pointer to the GPR targeted by the dispatched instruction into the GPR field of the selected RMAP entry in step 1226, and, in step 1228 sets the A-bit of the selected RMAP entry.

If, in step 1210 the dispatched instruction is not interruptible, then the processor proceeds to step 1212 where the processor determines whether the L-vector corresponding to the targeted GPR register is set. If so, then in step 1214, the processor resets the A-bit in the entry presently targeted for the GPR in the RMAP and proceeds to step 1224. If the bit in the L-vector is not set, then flow proceeds to step 1216 and the processor sets the bit in the L-vector corresponding to the targeted GPR. Next, the processor proceeds to step 1218 and resets the A-bit and sets the H-bit in the entry presently targeted for the GPR in the RMAP. Flow then proceeds to step 1222 where the processor sets the bit in the RH-vector corresponding to the physical register associated with the presently architected RMAP entry. Afterwards, flow proceeds through steps 1224, 1226 and 1228 as discussed previously.

Figure 10:
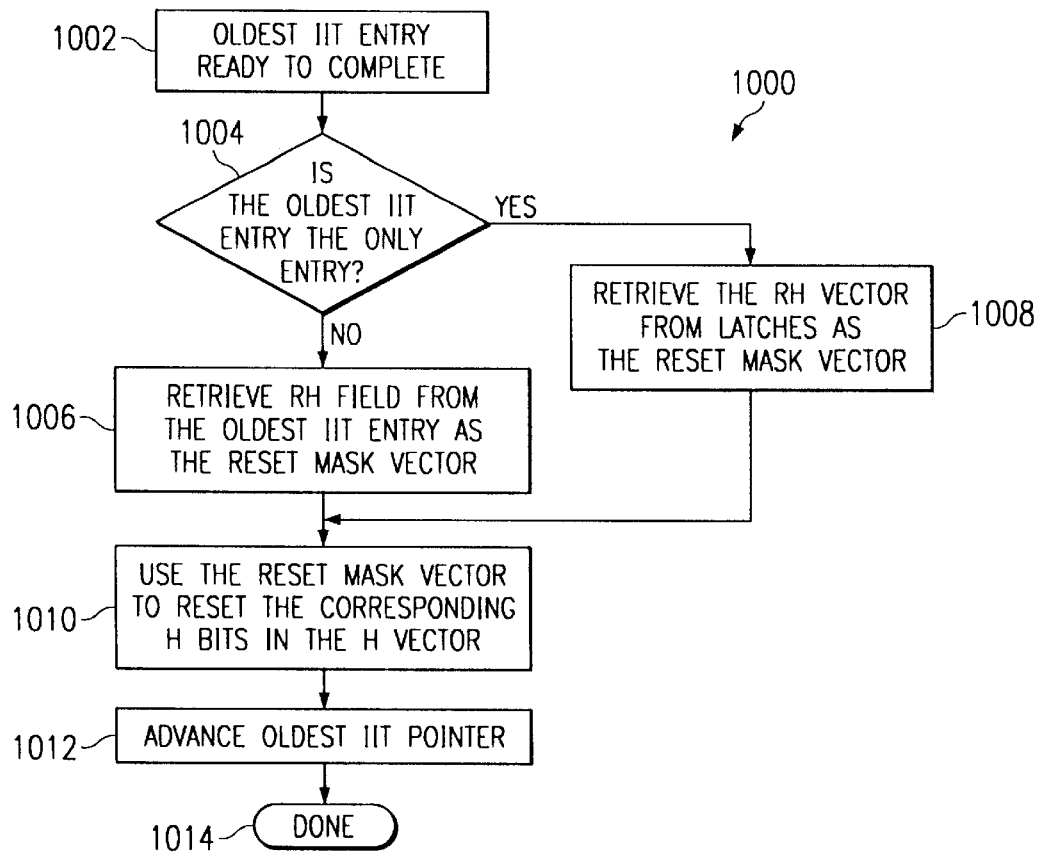
FIG. 10 is a flow chart illustrating a process for completing an executed instruction according to an embodiment of the invention.

After the RMAP and various vectors are set-up as discussed above upon the dispatch of interruptible instructions, these structures may be used to recover the state of the processor in the event of an excepting instruction, and also can be used to free up physical registers more quickly than conventional techniques when instructions complete without exceptions. Referring now to FIG. 10, there is shown a flow chart 1000 indicating the steps for freeing up physical registers through the use of the RH-vector when an instruction completes without an exception.

The process begins in step 1002 when a completion report is generated, as described with respect to FIG. 1A, for an interruptible instruction having the oldest entry in the IIT. The process then proceeds to step 1004 where it determines whether the completing instruction is also the only instruction which created a currently valid IIT entry. Determining whether the instruction is the only valid entry in the IIT table may be performed by reference to the status indication bits in the IIT table. The status indication in the IIT table will indicate whether a particular entry has already been completed, or whether it remains to be completed, in addition to whether the instruction has completed abnormally.

It will be appreciated from the above discussion that, for a given dispatched interruptible instruction, an entry is created in the IIT upon dispatch, but the RH-vector which is to be associated with this particular instruction in the instructions IIT entry, will not be available until a second interruptible instruction is dispatched later on in the program order. This is because the RH-vector accounts for all physical registers to be saved in H-space by instructions starting from the currently dispatched interruptible instruction through the instruction just prior to the next interruptible instruction. Upon dispatch of the second interruptible instruction, the RH-vector as stored in latch 314 shown in FIG. 3, is written into the RH-vector field of the IIT table for the first, i.e., immediately preceding, dispatched interruptible instruction.

Therefore, if the completing instruction in step 1004 is the only instruction in the IIT table, then the RH-vector must be retrieved from latches 314 in step 1008 for use as the reset mask vector. However, if there are other dispatched interruptible instructions, then flow proceeds to step 1006 where the vector stored in the RH-vector field of the IIT table entry for the particular completing instruction is retrieved for use as the reset mask vector.

Figure 11:
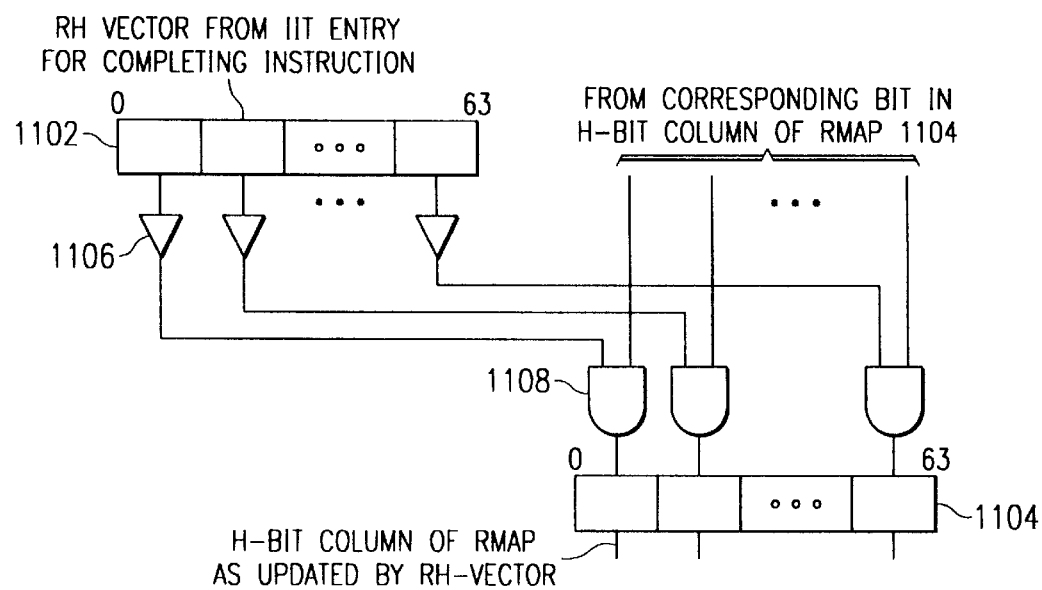
FIG. 11 is a schematic diagram of a circuit useful for updating the H-bit column of the RMAP according to an embodiment of the invention.

Following either step 1006 or 1008, flow proceeds to step 1010 where the processor uses the retrieved reset mask vector to reset the bits in the H-column of the RMAP. This is described in greater detail with respect to FIG. 11. FIG. 11 is a schematic diagram illustrating the generation and use of a reset mask vector to reset the H-bits in the RMAP upon completion of the interruptible instructions so that the physical registers reserved by the H-bits may be released for reuse by subsequently dispatched instructions. Specifically, the RH-vector from the IIT entry for the complete instruction, or from the RH-latches, is shown as a 64-bit vector (assuming there are 64 physical registers). The H-bit column from the RMAP storage at the time of processing the completing instruction is illustrated as a 64-bit vector from the storing latches 1104. Each bit of the RH-vector in location 1102 is inverted by a corresponding inverter, such as 1106, and then ANDed with corresponding bits from the H-bit column then re-stored in the H-bit column 1104. The ANDing is performed by the requisite number of AND gates, such as AND gate 1108. The output of each AND gate is then used to update the H-bit column of the RMAP 1104 Thus, it will be apparent that for any physical register which had a corresponding RH-bit set, then the H-bit in the RMAP for that particular physical register will be cleared upon the completion of the corresponding instruction. At this point, the physical register will be available for reuse.

Figure 12:
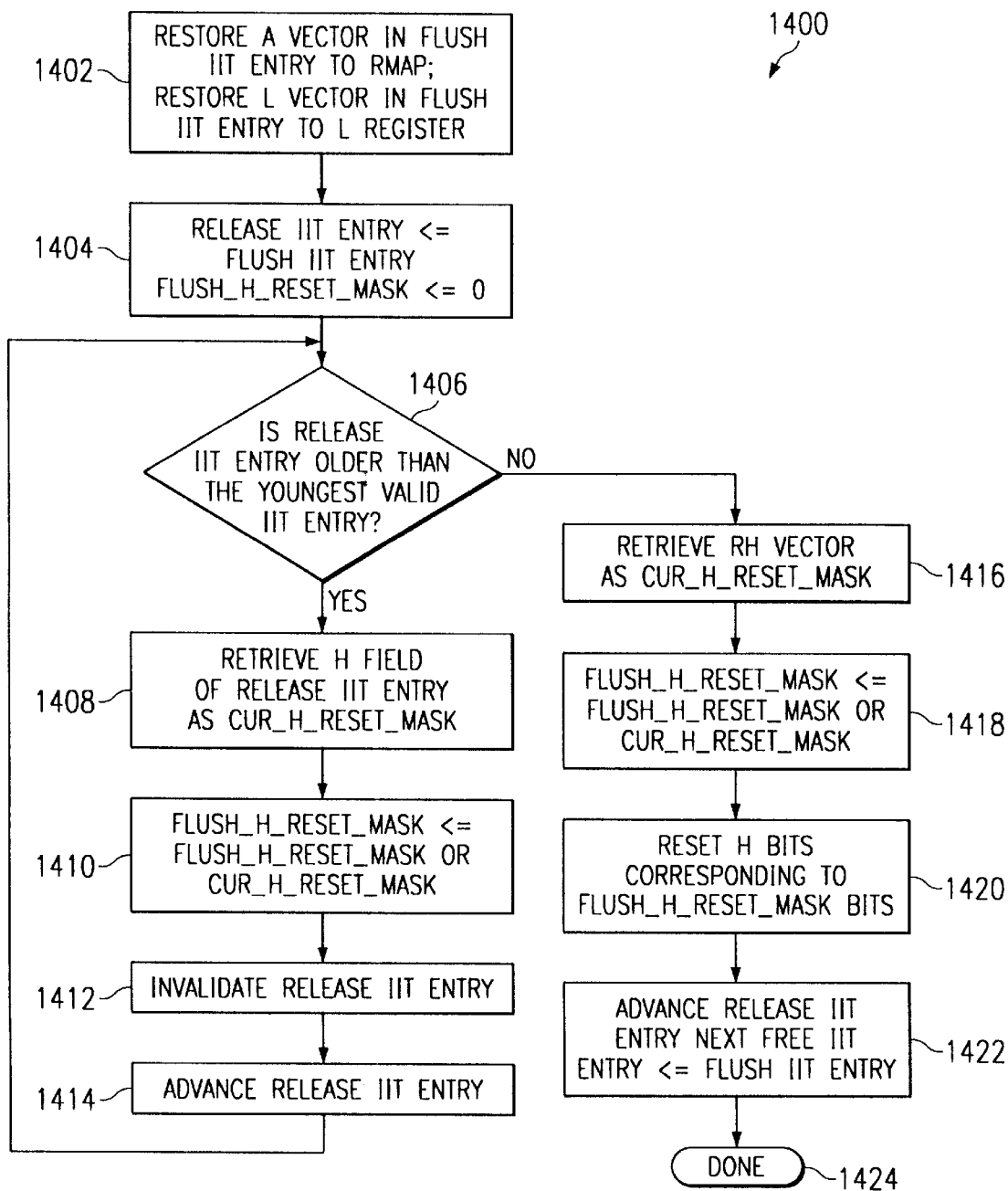
FIG. 12 is a flow chart illustrating a process for recovering from an exception causing instruction according to an embodiment of the invention.

Alternately, in the event a completing instruction causes an exception, for example due to a mispredicted branch, then the state of the processor must be restored to the state existing prior to the excepting instruction. This is described in greater detail with respect to FIG. 12. FIG. 12 is a flow chart showing a process 1400 for restoring the processor to a state prior to the excepting instruction which requires a flush of the register data generated by the excepting instruction and all other instructions dispatched subsequent to the excepting instruction. In step 1202, the processor first restores the A column in the RMAP and the L-vector to the state prior to the dispatch of the excepting instruction. This is done by retrieving the required data from the IIT. More specifically, when the execution unit which executes the excepting instruction finishes the instruction it provides a finished report, as discussed previously, which includes a pointer into the entry in the IIT table for the excepting instruction. This pointer is saved in a latch and will be referred to herein as the flush-IIT-entry pointer.

The flow chart in FIG. 12 depicts the algorithm for building a reset mask to reset specific H-vector bits in the RMAP in the case of a flush. The algorithm takes the flush-IIT-entry pointer as the starting release-IIT-entry, and takes the youngest (i.e., most recently created) IIT entry as the end release-IIT-entry. The diamond block 1406 tests for the end release-IIT-entry. For each entry between the starting and the end release-IIT-entries (not including the end), the RH-vector field is retrieved. All the RH-vector bits retrieved are ORed together with the RH-vector of block 314 FIG. 3 to form the flush-h-reset-mask.

In FIG. 12, block 1406, 1408, 1410, 1412 and 1414 form a loop and illustrate the process of building the flush-h-reset-mask by retrieving one RH-vector-field from an entry in the range of start and end release-IIT-entries (not including the end entry) each time the loop is traversed. The exit path of the loop is formed by block 1416, 1418, 1420, 1422 and 1424. Block 1416 and 1418 used the RH-vector of block 314 (FIG. 3) to logically OR with the partially formed flush-h-reset-mask to produce the final flush-h-reset-mask. (RH-vector of block 314 is used as the last input component for the OR operation because the end release-IIT-entry, being the youngest-IIT-entry, does not yet have the RH-field written in the entry).

Block 1420 uses the flush-h-reset-mask bits to reset the specific H-vector bits in the RMAP using the same apparatus as described in FIG. 11.

The asserted bits of flush-h-reset-mask are the union of the asserted bits in all RH-vector fields from all valid entries starting from the flush-IIT-entry (not including the youngest-IIT-entry). The asserted bits represent corresponding physical registers being reserved for potential recovery to the processor state as old as the one before instruction of the flush-IIT-entry is dispatched. All these registers have corresponding bits set in the H-vector in the RMAP. Resetting these bits by the flush-h-reset-mask releases these registers from reservation for recovery purpose.

Block 1422 updates the next-free-IIT-entry by the flush-IIT-entry. This step allows creation of new IIT entry starting from the position of the flush-IIT-entry.

Although the present invention has been illustrated with respect to particular embodiments, it will be understood by those skilled in the art that minor variations in form and detail may be made without departing from the scope and spirit of the present invention. All documents described herein are hereby incorporated by reference as though set forth in full.

What is claimed is:

1. A method for operating a processor, the method comprising:

dispatching an instruction;

determining a presently architected rename register map ("RMAP") entry for an architectural register targeted by the dispatched instruction, each RMAP entry having an architected register field, an architectural indicator field, a historical indicator field, and a use indicator field;

selecting RMAP entries which are associated with physical registers that contain source operands for the dispatched instruction;

updating the use indicator in the selected RMAP entries, the updated use indicator in the respective selected RMAP entry indicating that the respective entry is required by the dispatched instruction;

determining whether the dispatched instruction is interruptible; and updating the architectural indicator and the historical indicator in the presently architected RMAP entry if the dispatched instruction is uninterruptible.

2. A method as in claim 1 wherein updating a use indicator comprises setting a use bit ("U-bit") in the selected RMAP entries.

3. A method as in claim 2 wherein the U-bit is reset when the dispatched instruction is issued by the processor.

4. A method as in claim 1 wherein updating the architectural indicator and the historical indicator comprises clearing an architectural indication bit and setting a historical indication bit in the presently architected RMAP entry.

5. A method as in claim 1 further comprising updating a running H-bit vector ("RH-vector") having a plurality of bits which correspond to the physical registers when an interruptible instruction is dispatched.

6. A method as in claim 5 wherein a bit in the RH-vector which corresponds to a physical register that has an associated H-bit in the RMAP is set when the instruction is dispatched.

7. A method as in claim 5 wherein the RH-vector is stored, prior to being reset, in the interruptible instruction table entry associated with the last dispatched interruptible instruction when the dispatched instruction is interruptible.

8. A method as in claim 5 wherein the RH-vector is stored in the interruptible instruction table when the dispatched instruction is interruptible.

9. A method as in claim 1 wherein updating the architectural indicator and the historical indicator comprises resetting an architectural indication bit in the presently architected RMAP entry and setting a history indication bit in the presently architected RMAP entry if the bit in the logical vector corresponding to the targeted logical register is reset when the instruction is dispatched.

10. A method as in claim 9 further comprising the step of setting a bit in a logical vector corresponding to the targeted logical register when the instruction is dispatched.

11. A method as in claim 9 wherein updating the architectural indicator and the historical indicator comprises resetting only the architectural indication bit in the presently architected RMAP entry if the bit in the logical vector corresponding to the targeted logical register is set when the instruction is dispatched.

12. A method as in claim 9 further comprising resetting the architectural indication bit, setting the history indication bit and resetting all bits in the logical vector in the presently architected RMAP entry if the dispatched instruction is interruptible.

13. An apparatus for maintaining the state of a processor having a plurality of physical registers and a rename register map ("RMAP") which stores rename pairs that associate architected and physical registers, the RMAP having a plurality of entries which are associated with the physical registers, individual entries having an architected register field, an architected status bit, a history status bit, and a use bit, the apparatus comprising:

means for dispatching an instruction;

means for determining a presently architected RMAP entry for an architectural register targeted by the dispatched instruction;

means for selecting RMAP entries which are associated with physical registers that contain source operands for the dispatched instruction;

means for updating a use indicator in the selected RMAP entries;

means for determining whether the dispatched instruction is interruptible; and means for updating an architectural indicator and a historical indicator in the presently architected RMAP entry if the dispatched instruction is uninterruptible.

14. An apparatus as in claim 13 wherein the means for updating an architectural indicator and a historical indicator comprises means for determining whether an older instruction dispatched prior to the dispatched instruction and after the dispatch of the last interruptible instruction has targeted the same architectural register as the dispatched instruction.

15. An apparatus as in claim 14 further comprising means for updating both the architectural indicator and the historical indicator in the presently architected RMAP entry if the older instruction has not targeted the same architectural register as the dispatched instruction.

16. An apparatus as in claim 14 further comprising means for updating only the architectural indicator in the presently architected RMAP entry if the older instruction has targeted the same architectural register as the dispatched instruction.

17. An apparatus as in claim 14 wherein the means for determining comprises a vector having a plurality of bits which are associated with corresponding architectural registers.

18. An apparatus as in claim 13 wherein the means for updating a use indicator comprises a means for setting a use bit ("U-bit") in the selected RMAP entries.

19. An apparatus as in claim 18 further comprising means for resetting the U-bit when the dispatched instruction is issued by the processor.

20. An apparatus as in claim 13 wherein the means for updating an architectural indicator and a historical indicator comprises means for clearing an architectural indication bit and setting a historical indication bit in the presently architected RMAP entry.

21. An apparatus as in claim 13 further comprising means for updating a running H-bit vector ("RH-vector") having a plurality of bits which correspond to the physical registers for which the H-bit in corresponding RMAP entry is set when an interruptible instruction is dispatched.

22. An apparatus as in claim 21 wherein the means for updating a running H-bit vector sets a bit in the RH-vector corresponding to a physical register which formed, prior to the youngest dispatched interruptible instruction, the last renamed pair with the same target architectural register of the presently dispatched instruction.

23. An apparatus as in claim 21 wherein the means for updating a running H-bit vector resets the RH-vector when the dispatched instruction is interruptible.

24. An apparatus as in claim 21 further comprising means for storing the RH-vector in the interruptible instruction table, prior to resetting the bits in the RH-vector, when the dispatched instruction is interruptible.

25. An apparatus as in claim 13 wherein the means for updating an architectural indicator and a historical indicator comprises means for resetting an architectural indication bit in the presently architected RMAP entry and setting a history indication bit in the presently architected RMAP entry if the bit in the logical vector corresponding to the targeted logical register is reset when the instruction is dispatched.

26. An apparatus as in claim 25 further comprising means for setting a bit in a logical vector corresponding to the targeted logical register when the instruction is dispatched.

27. An apparatus as in claim 25 wherein the means for updating an architectural indicator and a historical indicator resets only the architectural indication bit in the presently architected RMAP entry if the bit in the logical vector corresponding to the targeted logical register is set when the instruction is dispatched.

28. An apparatus as in claim 25 further comprising means for resetting the architectural indication bit, setting the history indication bit and resetting all bits in the logical vector in the presently architected RMAP entry if the dispatched instruction is interruptible.

* * * * *